United States Patent [19]
Glance

[11] Patent Number: 5,949,573
[45] Date of Patent: Sep. 7, 1999

[54] TUNABLE WAVELENGTH CONVERTER

[75] Inventor: Bernard Glance, Colts Neck, Monmouth County, N.J.

[73] Assignee: AT&T, Middletown, N.J.

[21] Appl. No.: 08/922,126

[22] Filed: Aug. 28, 1997

[51] Int. Cl.[6] .................................................. G02F 1/39
[52] U.S. Cl. ........................ 359/326; 372/22; 359/332
[58] Field of Search .................................. 359/326–332; 372/21, 22

[56] References Cited

U.S. PATENT DOCUMENTS

| | | | |
|---|---|---|---|
| 5,002,350 | 3/1991 | Dragone | 350/96.15 |
| 5,345,455 | 9/1994 | Gabriagues et al. | 359/326 X |
| 5,781,334 | 7/1998 | Daendliker et al. | 359/326 |

OTHER PUBLICATIONS

B. Glance et al., "Applications of the Integrated Waveguide Grating Router", J. of Lightwave Technology, vol. 12, No. 6, Jun. 1994, pp. 957–962.

M. Zirngibl et al, "12frequency WDM laser based on a transmissive waveguide grating router", Electronics Letters, vol. 30, No. 9, Apr. 28, 1994, pp. 701–702.

T. Durhuus et al, "All–Optical Wavelength Conversion by Semiconductor Optical Amplifiers", J. of Lightwave Technology, vol. 14, No. 6, Jun. 1996, pp. 942–954.

M. Zirngibl et al., Characterization of a Multiwavelength Waveguide Grating Router Laser, IEEE Photonics Technology Letters, vol. 6, No. 9, Sep. 1994, pp. 1082–1084.

*Primary Examiner*—John D. Lee

[57] ABSTRACT

A tunable wavelength converter generates a selectable wavelength for an optical signal. The tunable wavelength converter includes an input active section, an output active section, an interferometer and an optical wavelength selector. The above components are integrated on a substrate between two mirrors. An optical input signal at a first wavelength is input through the input active section which in conjunction with the output section and the interferometer controls the amplitude of an optical signal at a second wavelength propagating in the laser cavity. The information contained in the amplitude of the input signal is transferred to the optical signal in the interferomic laser cavity and output by the output active section. Thus, the information of the optical input signal at the first wavelength is transferred to the optical output signal at the second wavelength.

27 Claims, 2 Drawing Sheets

TUNABLE WAVELENGTH CONVERTER

BACKGROUND OF THE INVENTION

1. Field of Invention

This invention relates to tunable optical wavelength converters for communications using optical fibers.

2. Technical Background

Wavelength Division Multiplexing (WDM) increases communication capacity of optical fibers. WDM uses different wavelengths of light to transmit independent information so that multiple communication channels can be provided using a single fiber. Thus, WDM systems provide upgrades of communication capacity without costs of additional fibers.

To implement WDM, wavelength converters are used to convert existing optical signal transmitters to change a source wavelength into a target wavelength so that wavelengths can be allocated to independent sources. Current wavelength converters based on an interferometer depend on critical phase adjustments of the interferometer to completely cancel the output laser signal. If the output signal is not completely canceled, remaining output signal continues to be transmitted and thus reduces the signal-to-noise ratio of the optical system. Complete cancellation requires exactly 180 degree phase shifts. Thus, precise phase shifts are required for optimal system performance. However, exact phase shifts are difficult to achieve. Thus, there is a need for a wavelength converter that achieves high signal-to-noise ratio without stringent phase shift requirements.

SUMMARY OF THE INVENTION

The invention provides a tunable wavelength converter that converts an optical signal from one wavelength to one of a set of wavelengths. The tunable wavelength converter includes an input active section, an output active section, an interferometer and an optical wavelength selector that provides wavelength selection. The above components are integrated on a substrate between two mirrors.

The input and output active sections are connected to waveguides. The interferometer is formed by a joint in the waveguides interconnecting the input active section, the output active section and the optical wavelength selector. The mirrors, the input and output active sections and the waveguides interconnecting the above components form an interferomic laser cavity.

During operation, the optical wavelength selector selects one of a predetermined number of wavelengths. With sufficient amplification provided in the lasing cavity, light at the selected wavelength begins to lase generating an optical output signal at the selected wavelength output through the output active section.

The optical output signal is amplitude modulated by an external optical input signal. The external optical input signal is input through the input active section which in conjunction with the output active section and the interferometer controls the amplitude of the optical signal. Thus, the information contained in the amplitude of the external optical input signal is transferred to the optical output signal. In the above manner, the information of the external optical input signal at a first wavelength is transferred to the optical output signal at a selectable second wavelength.

BRIEF DESCRIPTION OF THE DRAWINGS

An exemplary embodiment of the invention is illustrated in the accompanying drawings, wherein like numerals indicate like elements, and wherein.

DETAILED DESCRIPTION OF PREFERRED EMBODIMENTS

Figure 1:
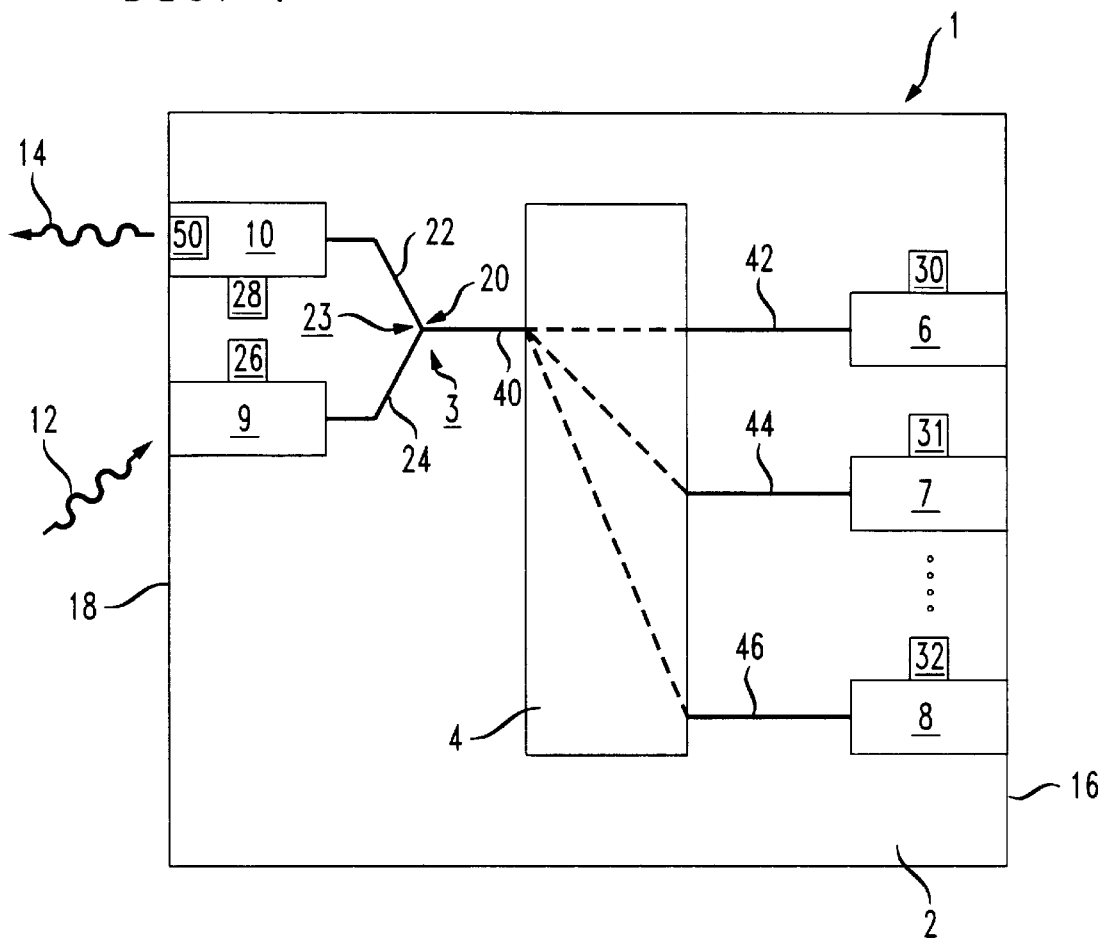
FIG. 1 shows a diagram of a tunable wavelength converter.

FIG. 1 shows an exemplary embodiment of a tunable wavelength converter 1 that includes an interferometer incorporated within a laser cavity forming an interferomic laser cavity 3. The tunable wavelength converter 1 includes, a wavelength grating router (WGR) 4, wavelength selector active sections 6–8, an input active section 9, an output active section 10, an output waveguide 22, and an input waveguide 24 integrated on a substrate 2.

The output and input waveguides 22 and 24 are joined together with a waveguide 40 at a waveguide joint 20 forming an interferometer 23. Thus, an optical signal propagating in the waveguide 40 toward the input and output sections 9 and 10 is split at the waveguide joint 20 and a first portion of the optical signal propagates in the waveguide 22 while a second portion propagates in the waveguide 24. The first and the second portions of the optical signal are recombined into the optical signal when the first and the second portions of the optical signal propagates toward the waveguide 40.

Each of the input, output and wavelength selector active sections 9, 10, 6, 7 and 8 has a corresponding electrode 26, 28, 30, 31 and 32, respectively. These electrodes bias the respective active sections to control an amplitude and phase of the optical signal.

The substrate 2 may be made from materials suitable for optical components such as Indium Phosphide (InP). Two mirrors 16 and 18 are formed on opposing outer edge surfaces of the substrate 2. The mirrors 16 and 18 together with the active sections 26, 28 and 6–8, the waveguides 22, 24 and 40–46 and the interferometer 23 define the interferomic laser cavity 3 of the tunable wavelength converter 1.

The wavelength selector, input and output active sections 6–10 are active devices having junctions such as a P-N junction. When the junctions are biased and optical signals enter the junctions, the electron-hole pair generation and recombination process is affected similar to that of a laser diode resulting in amplification or gain of the optical signal and a change in the phase of the optical signal. Thus, the biasing of an active section 6–10 controls both the amplification and the phase of the optical signal propagating through the active section 6–10.

When an active section is illuminated by an external light, the electron-hole densities (or charge densities) are affected and effectively change the refractive index of the active section. Thus, the phase of the optical signal propagating in the active section is changed in response to an amplitude of the external light. Accordingly, the phase of the optical signal may be controlled by an external light source.

The optical signal propagating within the interferomic laser cavity 3 reflects between mirrors 16 and 18. Starting with mirror 16 and the wavelength selector active section 6, for example, the optical signal propagates through waveguide 42 through the WGR 4 and is output through waveguide 40. Then, the optical signal is split at the waveguide joint 20 and the first portion of the optical signal propagates through waveguide 22 and through the output active section 10. The first portion of the optical signal is reflected by mirror 18 and returns through the output active section 10, waveguide 22, waveguide joint 20, waveguide 40, WGR 4, waveguide 42, wavelength selector active section 6 and is reflected by mirror 16.

A second portion of the optical signal propagates through the waveguide 24 and the input section 9. The second portion of the optical signal is reflected by the mirror 18, returns through the input active section 9 and the waveguide 24, and rejoins the first portion of the optical signal at the waveguide joint 20. The second portion of the optical signal propagates toward the mirror 16 along the same path as the first portion of the optical signal. Thus, the optical signal is the combined first and second portions between the waveguide joint 20 and the mirror 16. A similar optical signal propagation process occurs for the other wavelength selector active sections 7 and 8.

A particular wavelength selector active section 6–8 is selected by applying a first biasing voltage to one of the electrodes 30–32 corresponding to the selected active section 6–8 and a second biasing voltage to all other electrodes 30–32 corresponding to other active sections 6–8. When the first bias is applied to the active section 6 and the second bias is applied to active sections 7 and 8, for example, the active section 6 amplifies the optical signal propagating through the active section 6 but the other active sections 7 and 8 do not amplify the optical signal propagating through them. Thus, the amplitude of the optical signal associated with active section 6 increases and resonates in the interferomic laser cavity 3 while the other optical signals remain unexcited.

The biasing voltages are set based on a wavelength selection input signal. As discussed above, the biasing voltage determines the amplification or gain of each of the respective active sections 6–10.

Because the biasing voltage also affects the phases of the optical signals propagating through the active sections 6–10, the biasing voltages of the input and output active sections 9 and 10 may be used to adjust the relative phases of the first and second portions of the optical signal. For example, if an in-phase or out-of-phase relationship is desired at the waveguide joint 20, the biasing voltages of the input and output active sections 9 and 10 may be used to compensate for the difference in length between the waveguides 22 and 24 so that the proper phase relationship is obtained.

As discussed earlier, the wavelength selector, input and output active sections 6–10 are all biased to amplify the optical signal. The biases of the active sections 6–10 are coordinated such that the biases of the wavelength selector active section 6–8 increase or decreases the total amplification of the optical signals so that the amplitude of the selected optical signal is above or below a lasing threshold. The amplitude of the selected optical signal may exceed the lasing threshold while the non-selected optical signals cannot exceed the lasing threshold. Thus, when other conditions (to be discussed later) permit, the amplitude of the selected optical signal exceeds the lasing threshold and begin to lase. A portion of the selected optical signal is output through the output active section 10.

The WGR 4 is a device that separates different wavelengths of light by using a grating. By principles of constructive interference, light of different wavelengths entering the WGR 4 at an input location are separated and propagate to different output locations. Thus, placing the wavelength selector active sections 6–8 at selected output locations relative to the grating selects specific wavelengths corresponding to each of the active sections 6–8. When the optical signals are fed back to the selected output locations at the proper wavelengths, the optical signals are directed back to the input location. Thus, the WGR 4 inputs and outputs optical signals selected by the wavelength selector active sections 6–8.

The wavelength of the optical signal is directly related to the path length of the optical signal between the mirrors 16 and 18. Thus, the wavelength of the optical signal changes depending on which one of the active sections 6–8 are biased to amplify the optical signal. The tunable wavelength converter 1 outputs the optical signal at the selected wavelength by simply biasing one of the active sections 6–8.

Figure 2:
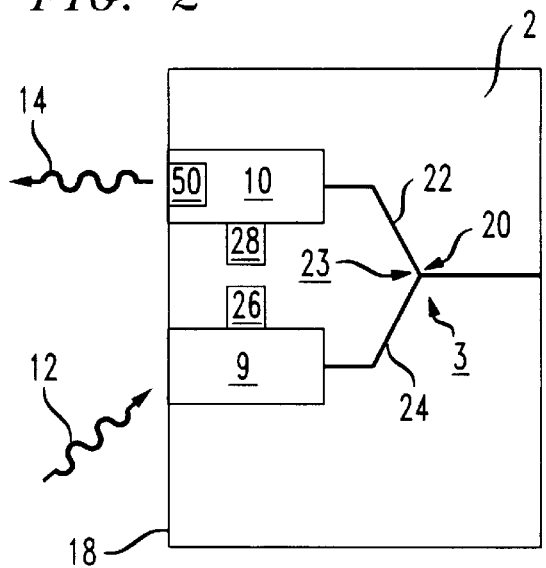
FIG. 2 shows a diagram of an interferometer.

FIG. 2 shows the interferometer structure in greater detail. The input and output active sections 9 and 10 provide optical amplification when properly biased by electrodes 26 and 28. As discussed above, the optical is signal propagating along waveguide 40 from the WGR 4 toward the mirror 18 is separated into the first and second portions of the optical signal at the waveguide joint 20. The first portion of the optical signal propagates along waveguide 22 through the output active section 10 and is reflected by mirror 18. The second portion of the optical signal propagates along waveguide 24 through the input active section 9 and is also reflected by mirror 18. The first and second portions of the optical signal reflected from the mirror 18 are amplified by the respective input and output active sections 9 and 10, and reunited at the waveguide joint 20.

If the reflected first and second portions of the optical signal are in-phase when reunited at the waveguide joint 20, then the reflected first and second portions are combined constructively to form an amplified optical signal. However, if the phases of the reflected first and second portions of the optical signal are interfering destructively (i.e. out-of-phase, such as about 180 degrees out-of-phase), then the reflected first and second portions combine destructively, and thus the gain is below the lasing threshold. Therefore, by controlling the phases of the reflected first and second portions, the amplitude of the optical signal can be precisely controlled.

The phase of the second portion of the optical signal may be controlled by an external optical input signal such as optical input signal 12. When the optical input signal 12 is applied to the input active section 9, the amplitude of the optical input signal 12 changes the refractive index of the input active section 9 which in turn changes the phase of the second portion of the optical signal. Thus, the amplitude of the combined first and second portions may be controlled by the optical input signal 12. Assuming that the input and output active sections 9 and 10 are biased to adjust the first and second portions to be in-phase (or out-of-phase), information carried by the amplitude of the optical input signal 12 may be transferred to the amplitude of the optical signal.

If the biases of the selector, input and output active sections 6–10 are set so that the amplification provided by the active sections 6–10 are sufficient for the amplitude of the optical signal to exceed the lasing threshold, then the tunable wavelength converter 1 may be placed in a lasing state or in an non-lasing state determined completely by the amplitude of the optical input signal 12. For example, if the active sections 6–10 are biased so that the first and second portions of the optical signal are about 180 degrees out-of-phase at the waveguide joint 20, then the first and second portions would combine destructively. However, if the second portion is further phase shifted by about 180 degrees, then the first and second portions would be in-phase and thus combine constructively and increase the amplitude of the optical signal so that the optical signal exceeds the lasing threshold.

To obtain the 180 degrees phase shift, the input active section 9 would need to phase shift the second portion of the optical signal by 90 degrees or π/2 radians. Only 90 degrees phase shift is required because the second portion of the optical signal propagates through the input active section 9 twice, once when entering the input active section 9 from the waveguide 24 and once when reflected from the mirror 18. Thus, when the amplitude of the optical input signal 12 exceeds a predetermined value (i.e. high), the input active section 9 shifts the phase of the second portion of the optical signal by 90 degrees.

While 180 degrees is used for convenience, any phase shift that alternates (or amplifies) the amplitude of the optical signal sufficient to transition above or below the lasing threshold is acceptable. Thus, the amount of phase shift is not critical to the amplitude of the output optical signal. Accordingly, the signal-to-noise ratio of the tunable wavelength converter 1 is not critically dependent on phase shift accuracy.

If the amplitude of the optical input signal 12 represents a digital signal such as "1" when high or "0" when low (i.e. below the lasing threshold), for example, then the tunable wavelength converter 1 may be placed in a lasing state or in a non-lasing state corresponding to the data (1 or 0) carried by the amplitude of the optical input signal 12. Because the tunable wavelength converter 1 outputs an optical output signal 14 when placed in a lasing state and ceases to output the optical output signal 14 when placed in a non-lasing state, the amplitude of the optical output signal 14 may be directly controlled by the amplitude of the optical input signal 12. Since the wavelength of the optical output signal 14 is controlled by selecting one of the wavelength selector active sections 6–10, the tunable wavelength converter 1 effectively transfers the information carried by the amplitude of the optical input signal 12 having a first wavelength to the amplitude of the optical output signal 14 having a second wavelength. Thus, the tunable wavelength converter 1 converts an optical input signal into an optical output signal where the input and the optical output signals have different wavelengths.

Figure 3:
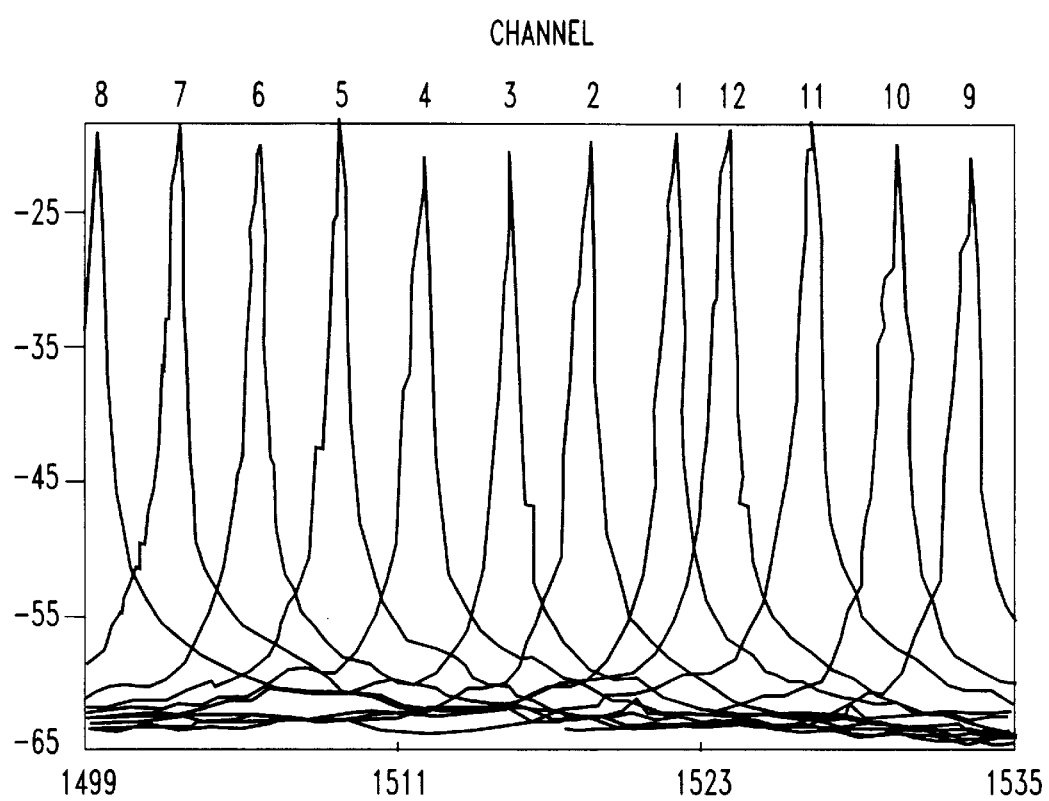
FIG. 3 shows an example of wavelengths output by the tunable wavelength converter.

FIG. 3 shows an optical spectrum for a specific tunable wavelength converter 1 having a WGR 4 and wavelength selector active sections 6–8 as described above. The numbers above each "peak" indicate the channel corresponding to each wavelength selector active section 6–8. For this example, there are 12 wavelength selector active sections 6–8. The lasing wavelengths cover a wavelength range of about 1499–1533 nm and are spaced by about 3.2 nm.

While this invention has been described in conjunction with specific embodiments thereof, it is evident that many alternatives, modifications and variations would be apparent to those skilled in the art. For example, an interferometer other than the described waveguide joint 20 may be used. Accordingly, preferred embodiments of the invention as set forth herein are intended to be illustrative, not limiting. Various changes may be made without departing from the spirit and scope of the invention as defined in the following claims.

What is claimed is:

1. A tunable wavelength converter, comprising:
an optical input terminal receiving an optical input signal, the optical input signal carrying information;
a control input terminal receiving an input control signal; and
an optical output signal generator coupled to the optical input terminal and the control input terminal, the optical output signal generator generating an optical output signal at a wavelength selected by the input control signal, the optical output signal carrying the information that is carried in the optical input signal, wherein the optical output signal generator comprises:
a wavelength selector controlled by the input control signal;
an optical amplifier;
an optical phase shifter controlled by the optical input signal; and
an interferometer coupled to the wavelength selector, the optical amplifier and the optical phase shifter within an interferomic laser cavity, wherein the optical output signal generator generates the optical output signal based on the optical input signal, the optical output signal having a wavelength selected by the wavelength selector.

2. The tunable wavelength converter of claim 1, wherein the wavelength selector comprises a plurality of active sections corresponding to a plurality of wavelengths, each of the active sections having a corresponding electrode that receives a biasing voltage, the active sections amplify optical signals propagating through the active sections based on the biasing voltage.

3. The tunable wavelength converter of claim 2, wherein the biasing voltage of the electrode corresponding to each of the active sections is determined based on the input control signal.

4. The tunable wavelength converter of claim 2, wherein the wavelength selector further comprises a wave grating router coupled to the active sections, the wave grating router includes a first port and a plurality of second ports corresponding to the plurality of wavelengths, a first optical signal entering the first port is separated into a plurality of second optical signals, each of the second optical signals corresponding to one of the second ports and the second optical signals exiting the wave grating router through the respective second ports.

5. The tunable wavelength converter of claim 4, wherein when the second optical signals enters the wave grating router through the corresponding second ports, the second optical signals exits the wave grating router through the first port.

6. The tunable wavelength converter of claim 4, wherein each of the active sections are connected to a corresponding one of the second ports.

7. The tunable wavelength converter of claim 1, wherein the interferometer comprises a first waveguide, a second waveguide and a third waveguide, the first, the second and the third waveguides being joined at a waveguide leakage point, a first optical signal and a second optical signal propagating through the first and the second waveguides, respectively, being combined at the waveguide leakage point into a third optical signal that propagates through the third waveguide in a direction away from the first and the second waveguides, when propagating in a direction toward the first and the second waveguides, the third optical signal being split into the first and the second optical signals propagating in a direction away from the third waveguide.

8. The tunable wavelength converter of claim 7, wherein the first waveguide is connected to an input active section, the second waveguide is connected to an output active section and the third waveguide is connected to the wavelength selector.

9. The tunable wavelength converter of claim 1, wherein the optical phase shifter includes an input active section and the optical amplifier includes the input active section, an output active section, and a wavelength selector active section, the input active section being connected to the interferometer through a first waveguide and the output active section being connected to the interferometer through a second waveguide, the interferometer being connected to the wavelength selector through a third waveguide, a first optical signal, a second optical signal, and a third optical signal propagating through the first, the second and the third waveguides, respectively.

10. The tunable wavelength converter of claim 9, wherein an amplitude of the third optical signal is controlled based on the amplitude of the optical input signal.

11. The tunable wavelength converter of claim 10, wherein the optical input signal changes a phase of the first optical signal so that a relationship of the first and the second optical signals is changed between in-phase and out-of-phase, the amplitude of the third optical signal being set depending on whether the relationship of the first and the second optical signals is in-phase or out-of-phase.

12. The tunable wavelength converter of claim 11, wherein an amplitude of the second optical signal corresponds to the amplitude of the third optical signal, the third optical signal being output through the output active section as the optical output signal.

13. The tunable wavelength converter of claim 1, wherein the wavelength selector, the optical amplifier, the optical phase shifter and the interferometer are integrated on a substrate.

14. The tunable wavelength converter of claim 13, wherein a pair of opposing edge surfaces of the substrate are formed into mirrors and the wavelength selector, the optical amplifier, the optical phase shifter and the interferometer interconnected by waveguides are disposed between the mirrors forming the interferomic laser cavity.

15. The tunable wavelength converter of claim 13, wherein the substrate includes indium phosphide.

16. A method for converting an optical input signal having a first wavelength into an optical output signal having a selectable second wavelength, the method, comprising:

receiving the optical input signal, the optical input signal carrying information;

receiving an input control signal; and generating the optical output signal using an interferometic laser cavity at the second wavelength selected by the input control signal, the optical output signal carrying information that is carried by the optical input signal.

17. The method of claim 16, further comprising selecting the second wavelength by applying biasing voltages based on the input control signal to a plurality of active sections of a wavelength selector, wherein the active sections amplify optical signals propagating through the active sections based on the biasing voltages.

18. The method of claim 16, wherein the generating step comprises:

selecting a gain of the interferometic laser cavity so that an optical signal of the selected wavelength may exceed a lasing threshold;

phase shifting a first portion of the optical signal;

combining a second portion of the optical signal with the phase shifted first portion of the optical signal in an interferometer to form the optical signal, the amplitude of the optical signal based on whether the first and the second portions of the optical signal are in-phase or out-of-phase; and outputting the second portion of the optical signal.

19. The method of claim 18, wherein the phase shifting step comprises:

propagating the first portion of the optical signal through an input active section; and directing the optical input signal to the input active section.

20. The method of claim 19, wherein the refractive index of the input active section is changed by the optical input signal, the phase of the first portion of the optical signal being changed when propagating through the input active section having the changed refractive index.

21. The method of claim 20, wherein the first portion of the optical signal propagates through the input active section two times and the input active section changes the phase of the first portion of the optical signal by about 90 degrees for each of the two times.

22. The method of claim 20, wherein when the amplitude of the optical input signal is high, the phase shifted first portion and the second portion are in-phase and when the amplitude of the optical input signal is low, the phase shifted first portion and the second portion are out-of-phase.

23. The method of claim 22, wherein when the phase shifted first portion and the second portion are in-phase, the amplitude of the optical signal exceeds the lasing threshold and the optical output signal being outputted, and when the phase shifted first portion and the second portion are out-of-phase, the amplitude of the optical signal does not exceed the lasing threshold and the optical output signal not being outputted.

24. The method of claim 23, wherein the information carried by the optical input signal is represented by highs and lows of the amplitude of the optical input signal, the highs and lows of the amplitude of the optical input signal being transferred to the second portion of the optical signal and output as the optical output signal.

25. The method of claim 18, wherein the interferometer combines the phase shifted first portion and the second portion of the optical signal at a waveguide joint.

26. The method of claim 18, wherein the gain is selected by setting biasing voltages to a plurality of active sections of a wavelength selector and setting biasing voltages of an input active section and an output active section.

27. The method of claim 16, wherein the interferometric laser cavity includes an interferometer.

* * * * *